US012689151B2

(12) United States Patent
Hartl

(10) Patent No.: US 12,689,151 B2
(45) Date of Patent: Jul. 21, 2026

(54) HERMETICALLY SEALED ELECTRICAL FEED-THROUGH HAVING A PLUG GUIDE COMPONENT

(71) Applicant: Schott AG, Mainz (DE)

(72) Inventor: Helmut Hartl, Klosterneuburg (AT)

(73) Assignee: SCHOTT AG, Mainz (DE)

( * ) Notice: Subject to any disclaimer, the term of this patent is extended or adjusted under 35 U.S.C. 154(b) by 279 days.

(21) Appl. No.: 18/116,587

(22) Filed: Mar. 2, 2023

(65) Prior Publication Data

US 2023/0208073 A1     Jun. 29, 2023

Related U.S. Application Data

(63) Continuation of application No. PCT/EP2021/074073, filed on Sep. 1, 2021.

(30) Foreign Application Priority Data

Sep. 2, 2020    (DE) ..................... 10 2020 122 910.0
Sep. 1, 2021    (WO) ................. PCT/EP2021/074073

(51) Int. Cl.
| | |
|---|---|
| *H01R 13/52* | (2006.01) |
| *H01M 10/42* | (2006.01) |
| *H01M 10/613* | (2014.01) |
| *H01M 10/6567* | (2014.01) |
| *H01M 50/296* | (2021.01) |

(52) U.S. Cl.
CPC ...... *H01R 13/5216* (2013.01); *H01M 10/425* (2013.01); *H01M 10/613* (2015.04); *H01M 10/6567* (2015.04); *H01M 50/296* (2021.01)

(58) Field of Classification Search
CPC ............. H01M 50/186; H01M 50/172; H01M 50/296; H01R 13/5216; H01R 13/533; H01R 13/748
See application file for complete search history.

(56) References Cited

U.S. PATENT DOCUMENTS

| | | | | |
|---|---|---|---|---|
| 4,964,788 A | * | 10/1990 | Itameri-Kinter | ....... H01R 13/74 439/926 |
| 5,620,344 A | | 4/1997 | May et al. | |
| 7,364,451 B2 | * | 4/2008 | Ring | ....................... E21B 47/12 439/271 |

(Continued)

FOREIGN PATENT DOCUMENTS

| | | |
|---|---|---|
| DE | 10 2009 014 334 A1 | 9/2010 |
| DE | 10 2018 220 118 A1 | 5/2020 |

(Continued)

OTHER PUBLICATIONS

International Search Report and Written Opinion dated Jan. 4, 2022 for International Application No. PCT/EP2021/074073 (11 page).

*Primary Examiner* — Edwin A. Leon

(74) *Attorney, Agent, or Firm* — TAYLOR & EDELSTEIN, PC

(57) ABSTRACT

An electrical feed-through includes: a feed-through component having an opening; at least one conductor sealed into the opening of the feed-through component in a glass material or a glass ceramic material; and at least one guide component connected to the feed-through component, the at least one guide component including a material that is a plastic.

20 Claims, 3 Drawing Sheets

(56) References Cited

U.S. PATENT DOCUMENTS

| | | | |
|---|---|---|---|
| 7,481,674 B2 * | 1/2009 | Murakami ......... | H01R 13/5219 |
| | | | 439/587 |
| 10,224,521 B2 * | 3/2019 | Kroll ..................... | B23K 15/04 |
| 2005/0186823 A1 | 8/2005 | Ring et al. | |
| 2007/0225771 A1 | 9/2007 | Wegrzyn, III et al. | |
| 2010/0227492 A1 | 9/2010 | Suttner et al. | |
| 2014/0030902 A1 | 1/2014 | Baudelocque et al. | |
| 2019/0131591 A1 | 5/2019 | Beauvais et al. | |

FOREIGN PATENT DOCUMENTS

| | | | |
|---|---|---|---|
| JP | 1-1586696 U | 11/1989 |
| JP | 6-215819 A | 8/1994 |
| JP | 8-250245 A | 9/1996 |
| JP | 2015-201380 A | 11/2015 |
| JP | 2019-79605 A | 5/2019 |
| WO | 2012/110246 A1 | 8/2012 |
| WO | 2018/114392 A2 | 6/2018 |

* cited by examiner 20.1  3  20.2  1  22  14

10.1  9.1

10.2
7.1
12
7.2

5

9.2  30

A ──▶

7.4  7.1

7.5

7.2

7.6  7.3

3

50

A ──▶

9.2

7.2

7.1

200.1  9.1  200.3  200.2

200.2

200.3

7.1

200.1

1200

2000

1

1000          1100  1300.1  1300.2  1300.3  1300.4

1

3000    3300.8  3300.7  3300.6  3300.5    3100  3300.1  3300.2  3300.3  3300.4

HERMETICALLY SEALED ELECTRICAL FEED-THROUGH HAVING A PLUG GUIDE COMPONENT

CROSS REFERENCE TO RELATED APPLICATIONS

This is a continuation of PCT application no. PCT/EP2021/074073, entitled "BUSHING", filed Sep. 1, 2021, which is incorporated herein by reference. PCT application no. PCT/EP2021/074073 claims priority to German patent application no. 10 2020 122 910.0, filed Sep. 2, 2020, which is incorporated herein by reference.

BACKGROUND OF THE INVENTION

1. Field of the Invention

The present invention relates to an electrical feed-through including a feed-through component having an opening, at least one conductor sealed into the opening of the feed-through component, and at least one guide component connected to the feed-through component.

2. Description of the Related Art

Feed-throughs for electrical conductors, having a conductor sealed into a glass or glass ceramic material, have been disclosed by many applications. In this regard, for example, reference is made to WO 2012/110246 A1 or DE10 2018 220 118 A1. All the aforementioned documents concern feed-throughs which are introduced into a housing for storage apparatuses, in particular battery housings. The feed-throughs include conductors, with which heavy currents can be discharged into the storage apparatuses or from the storage apparatus, in particular the accumulators.

Accumulators, optionally for lithium ion batteries or nickel metal hydride batteries, may be used in various fields, for example for portable electronic equipment, cell phones, power tools or electrical vehicles.

Batteries may be either a primary battery, which is disposed of and/or recycled after its discharge, or an accumulator.

While feed-throughs in the prior art have always been battery applications, none of the aforementioned applications teaches the way in which an electrical feed-through must be configured in order to be connected on the one hand to a battery management system and on the other hand to a storage device, in particular battery.

Although WO 2012/110246 A1 describes the feed-through of a conductor, which is guided through a glass material and is connected to an electrode connection component, the electrode connection component is however connected firmly to the conductor, for example by a weld or solder connection. Such a connection is very elaborate and has the disadvantage that it is not releasable. Furthermore, the conductors according to WO 2012/110246 A1 are supply lines carrying heavy currents to the battery cell and away from the battery cell. The invention, conversely, is intended for the feed-through of control lines.

US 2019/0131591 A1 presents a feed-through having a sealed conductor and an insulating element consisting of plastic, through which the conductor is guided. The insulating element, however, serves merely for insulation and not for guiding. In particular, the insulating element is not used so that a plug can be slid with an accurate fit onto a conductor sealed in a glass or glass ceramic material. Nothing about this is mentioned in US 2019/0131591 A1.

Furthermore, US 2019/0131591 A1 also describes a battery and therefore a storage device, although a separating wall which separates a first and second region from one another is not disclosed in US 2019/0131591 A1. In particular, it is not described in US 2019/0131591 A1 that the first region is a humid region and the second region is a dry region.

Besides US 2019/0131591 A1, US 2014/0030902 A1 also presents a feed-through. As in US 2019/0131591 A1, the plastic part merely serves as an insulator, and a guide component which is used to slide a plug with an accurate fit onto the at least one conductor sealed in a glass or glass ceramic material is also not presented in US 2014/0030902 A1.

DE 10 2009 014 334 B4 likewise presents a feed-through having a tubular element, which is used to guide a conductor onto a socket. It is not explicitly described in DE 10 2009 014 334 B4 that the tubular component consists of a plastic material. Furthermore, DE 10 2009 014 334 B4 does not teach that the insulating body, into which the conductor is embedded, consists of a glass or glass ceramic material and the conductor is therefore sealed.

What is needed in the art is to overcome the disadvantages of the prior art and, in particular, to provide a feed-through which can be connected simply and optionally reversibly to lines via plug connections.

What is also needed in the art is a storage device which can be cooled better than previously.

SUMMARY OF THE INVENTION

The electrical feed-through according to the present invention includes a guide component, which is connected to the feed-through component. By this measure, it is possible to produce a feed-through in which a plug can be slid with an accurate fit onto the at least one conductor, sealed in a glass or glass ceramic material, of the feed-through component. According to the present invention, the guide component consists of a plastic material which is connected to the feed-through component, optionally consisting of a metallic material. The configuration of the guide component consisting of a plastic material, in particular a thermosetting plastic material, is advantageous since the elaborate geometry of the guide component can only with difficulty and with great outlay, in particular processing outlay, be produced from the same material as the feed-through component, which optionally consists of metal.

The use of a thermoplastic material instead of a thermoset is also optional since the guide component may then be produced simply in its elaborate geometry by an injection molding method. Furthermore, thermoplastics can be melted by heating and recycled. In this case, the original material properties are preserved.

In general, the guide component consisting of plastic may be obtained very simply by the injection molding method.

In order to connect the guide component reliably to the feed-through component consisting of metal, the guide component is configured in such a way that it can be connected securely to the feed-through component.

Secure connection is, for example, provided according to an optional embodiment in that the feed-through component includes at least one undercut for connection to the guide component. The plastic of the guide component may be injected into the undercut by an injection molding method for the guide component. Since the expansion coefficient of the plastic material is higher than that of the metal, the plastic is retained in the undercut of the metal feed-through material so that the plastic and therefore the guide component are connected securely to the feed-through component.

It is particularly advantageous for the undercut to have a conical profile in the direction of the feed-through component. The conical profile ensures that the plastic is retained even better in the undercut, so that the plastic and the feed-through component consisting of metal are connected to one another very firmly. In particular, such a configuration provides a robust connection without play. The robust connection is also distinguished by a high resistance to vibrations and acceleration forces. The secure connection of the guide component and the feed-through component is a firm, that is to say non-releasable, connection of two components consisting of different materials, namely the metal of the base body and the plastic of the guide component.

The guide component is, in particular, configured in such a way that it can receive at least one plug which is connected to the at least one conductor. In the guide component the plug may be slid onto the at least one conductor which is sealed in the feed-through component. Optionally, a multiplicity of conductors, for example six conductors lying next to one another, are sealed in the glass or glass ceramic. The plug then likewise includes a multiplicity of recesses, for example a total of six recesses, which may then be plugged onto the total of six conductors. The number of sealed conductors is not restricted, and in principle multiple sealing of an unlimited number of conductors is conceivable. These cases involve multiple feed-throughs.

In one particular embodiment, the plug is configured in such a way that it can be connected securely to the guide component. For this purpose, in one configuration of the invention, the guide component includes a recess and the plug includes at least one latching lug which can engage into the recess. In contrast to secure connection of the guide component and the feed-through component which is permanent, that is to say non-releasable, the secure connection of the plug and the guide component is an impermanent connection, that is to say a connection which can be released by pressing the latching lug out from the recess.

In one particularly optional configuration, the conductor is a double-sided conductor, that is to say a conductor which may be provided with a plug on two sides after sealing into the opening of the feed-through component.

If the conductor is not configured in one part, the conductor may consist of three parts in all, namely a first end section, optionally having a rectangular cross section, a central section, optionally having a round cross section, and a second end section, optionally having a rectangular cross section. It is then possible that the round central section of the conductor can be sealed well, while the first end section and the second end section having a rectangular cross section can be connected with reliable contact to a plug. The different sections may also include different materials.

As an alternative to a three-part conductor, a one-part conductor may also be provided. In the case of a one-part conductor, the end sections, optionally first and second end sections, are also configured with a rectangular cross section. Continuous conductors having a rectangular cross section, in particular continuous 4-sided pins, may also be sealed, optionally sealed pressure-tightly. Continuous 4-sided pins in their one-piece embodiment generally consist of one and the same material, that is to say the end sections include the same material as the sealed central section, for example copper or NiFe.

In the case of a multipart, for example 3-part pin, the different sections may on the other hand include different materials, for example with the end sections having a rectangular cross section including copper and the round central section which is sealed including NiFe. The end sections consisting of copper, which are connected to a plug, are distinguished by a high conductivity, while the central section consisting of NiFe is distinguished by a good ability to be sealed, especially for the case of compression sealing.

A further advantage of the embodiment other than a one-part embodiment is that a first end section, second end section and central section may respectively be produced individually, and after production of the individual parts, namely the first end section, the central section and the second end section as individual parts, the parts are connected, in particular soldered and/or welded, to one another in order to form a conductor. Optionally, the individual sections are produced from a drawn or rolled profiled wire. In particular, it is possible that, for example, the first and second end sections have a rectangular cross section and, in contrast thereto, the central section has a round cross section. Owing to the symmetry, the round cross section can be sealed particularly well. A further advantage of the different sections, which are connected in order to form a conductor, is that different materials may be used for the different sections. For instance, it is possible to form the end sections, which are connected to the recesses of the plug, from highly current-carrying copper and to form the central section, which is sealed, from NiFe. Configuring at least the end sections with a four-sided cross section has the advantage that they can be connected particularly well to a plug. Besides the four-sided cross section, for example of the end sections of the pins, other polygonal cross sections are also conceivable, for example a hexagonal or octagonal cross section.

Optionally, the electrical feed-through according to the present invention is employed in a separating wall which separates a humid region, in particular a region carrying liquid, from a dry region. Separation of a humid region from a dry region is advantageous but in no way mandatory. Optionally, the humid region includes a liquid coolant, for example water or oil, in particular liquids for immersion cooling. In the case of immersion cooling, an electrical component, for example a storage device, is immersed in a dielectric liquid, which is thermally conductive, for the cooling. Liquids for immersion cooling may be fluoropolymers, synthetic esters or hydrocarbon/oil mixtures. Control components, which do not require liquid cooling and/or immersion cooling, are optionally arranged in the dry region separated from the humid region with the aid of the separating wall. It is also possible to provide parts of the control electronics with immersion cooling. As an alternative thereto, it is conceivable for the humid region to be filled with an electrolyte. In this case, for example, the humid region forms a storage cell of a battery or of a capacitor.

Arrangements in which two humid regions are separated from one another are therefore conceivable. For example, this is the case when for example two regions having liquids for immersion cooling need to be separated by a separating wall. Besides storage devices, parts of the control electronics may also be arranged in the regions cooled by immersion. It is also possible for the liquids introduced into one of the two regions or both regions to be an electrolyte, for example of a storage device.

Although the separation of two regions is described here, more than two regions may also be separated from one another by separating walls, for example four or more regions. If such separating walls are used in systems having storage devices, the separating wall in a first configuration makes it possible for a region carrying liquid and a dry region to be separated from one another. The region carrying liquid allows cooling of the storage device, in particular of the battery, for example with a liquid such as water or oil, and in particular immersion cooling. In this way, the longevity of the storage device may be increased. With the cooling, it is furthermore possible that the storage devices may be charged more rapidly with heavier currents.

Liquid cooling, for example immersion cooling, optionally for the storage device, is arranged on one side of the separating wall, and the control device for controlling the storage devices, for example the battery, is arranged on the other side, for example in a dry region. Optionally, the separating wall includes an opening into which the feed-through component of the feed-through can be inserted, optionally tightly with an O-ring.

Besides the feed-through, the invention also provides a conductor for a feed-through, optionally a battery feed-through. The conductor according to the present invention is characterized in that the conductor includes a first end section, optionally having a rectangular cross section, and a central section, optionally having a round cross section. In one developed embodiment, the conductor may furthermore include a second end section, optionally having a rectangular cross section.

It is particularly optional for the first end section and the central section to be individual parts which are connected, in particular electrically connected, in particular soldered and/ or welded, to one another in order to form a conductor. A one-piece embodiment having rectangular end sections is also possible. In the case of multipart conductors, the individual sections may include different materials. In the case of a one-piece embodiment, the material of the end sections is identical to the material of the central section. Furthermore, in the case of a one-part conductor the cross section of the central section is optionally equal to that of the end section. If the end sections have a four-sided cross section, for example, in a one-piece conductor the central section optionally also has a four-sided cross section.

In general, it is the case that the material of the end sections of the conductor is selected in such a way that it is tailored to the contact requirements, for example of a plug connection. In this case, the material may be selected so that the contact or junction resistance is low and there is a high conductivity. For example, copper is optional for a high conductivity. The material of the central section of the conductor is optionally tailored to the glass material and the nature of the sealing. The sealing may optionally be compression sealing and sealing for a matched feed-through. Optional materials for the central section are NiFe for compression sealing. Kovar may also be employed in the central section. Whether there is compression sealing or a matched feed-through is determined by the expansion coefficients of the conductor, the material and base body, or the housing, into which the sealing is carried out. In the case of a matched feed-through, the expansion coefficients of the conductor, the glass material and the base body are approximately equal, or substantially correspond to one another, while in the case of compression sealing the expansion coefficient of the base body or of the material surrounding the opening into which the conductor is sealed is selected so that a compressive pressure is exerted onto the glass and the conductor, for example by the base body. In the case of compression sealing, the thermal expansion coefficient of the glass material is lower than that of the base body or housing material, so that pressure can be built up onto the glass material by the housing material or base body. Conductors divided into several parts provide conductors which are optimally matched to the sealing and to the plug contacts.

In the case of a one-piece conductor having rectangular end sections, it is also possible to seal the conductor with rectangular cross section, so-called continuous 4-sided pin, pressure-tightly. In the case of one-piece conductors, the cross section of the end sections is optionally identical to the cross section of the central section which is sealed.

Optionally, the material of the first and second end sections and of the central section or of the one-piece conductor is one or more of the following materials: Cu, a Cu alloy, NiFe, an NiFe alloy. Ti or a titanium alloy, aluminum, gold, steel or stainless steel, iron, brass, bronze or Kovar are also possible materials. Ti or titanium alloys as materials for the conductor are also of interest particularly for medical applications.

In one optional embodiment, the material for the central section is NiFe or an NiFe alloy, and Cu or a Cu alloy are provided for the first end section and/or the second end section. Such an embodiment of a conductor has a high conductivity in the region of the plug connection and allows compression sealing.

Besides the feed-through, in particular the electrical feed-through, the present invention also provides a storage device having improved cooling. The improved cooling is achieved in that regions having storage devices are provided, for example, with immersion cooling. Different regions are separated from one another by a separating wall.

The present invention will be described below with the aid of the drawings, without restriction thereto.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figures 1, 2, 3:
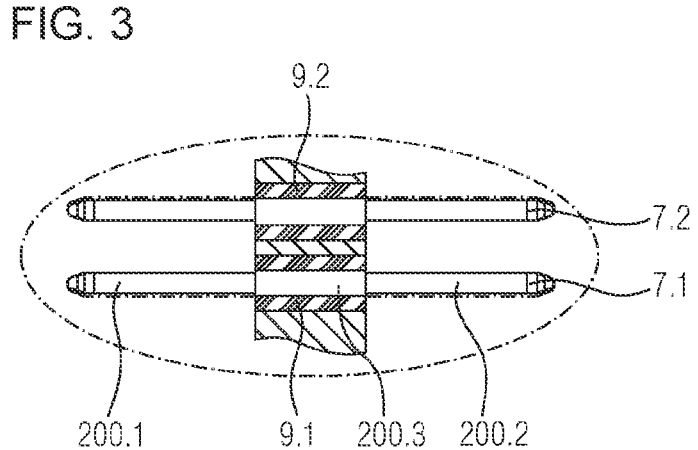
FIG. 1 shows a section through an electrical feed-through according to the present invention.
FIG. 2 shows a front view of an electrical feed-through according to FIG. 1.
FIG. 3 shows two conductors of the feed-through which are sealed while lying next to one another.

FIG. 1 shows a sectional view of an electrical feed-through 1 according to the present invention, which may optionally be fitted into a separating wall (not represented).

The separating wall is part of a system having a storage device, the storage device being for example cooled with liquid, for example water or oil or a liquid for immersion cooling, so that the separating wall separates a dry region from a wet region. The electrical feed-through according to the present invention therefore provides an electrical connection between the dry region and the wet region. As is represented in FIG. 1, the electrical feed-through 1 according to the invention includes a feed-through component 3 having an opening or openings 5 introduced into the feed-through component 3. In the present embodiment a plurality of conductors, in total six conductors in this embodiment, are sealed into the opening or openings 5 of the feed-through component 3 in a glass or glass ceramic material 9.1, 9.2. In the sectional view in FIG. 1, two conductors 7.1 and 7.2 lying next to one another are represented. The glass or glass ceramic material introduced into the opening or openings 5 is denoted by 9.1 and 9.2. The glass or glass ceramic material 9.1, 9.2 is introduced between conductors 7.1, 7.2 and the walls of the opening or openings 5. In one configuration of the invention, the expansion coefficient of the glass or glass ceramic material can be selected to be lower than the expansion coefficient of the material of the feed-through component 3. In such a case, compression sealing, that is to say a hermetically sealed feed-through, is provided by the feed-through component 3. Hermetically sealed means that, with a pressure difference of 1 bar, the helium leakage rate is less than $1 \cdot 10^{-8}$ mbar $1/s^{-1}$, optionally less than $1 \cdot 10^{-9}$ mbar $1/s^{-1}$. As an alternative to compression sealing, sealing in which the expansion coefficients of glass and surrounding material are not different, or are only slightly different, would also be possible. In such a case, the feed-through is a matched feed-through. Compression sealing is optional, however, since a sealed, in particular hermetically sealed, feed-through as defined above is thereby provided. The material of the feed-through component and/or of the conductor is a metallic material, in particular steel, non-rusting steel, stainless steel or tool steel, or a light metal such as aluminum. Stainless steel, and in particular microalloyed steels, are optional as a material for the housing. The conductors may, for example, include NiFe. The expansion coefficient of the metallic material lies in the range of from $10 \cdot 10^{-6}$ 1/K to $25 \cdot 10^{-6}$ 1/K, optionally from $10 \cdot 10^{-6}$ 1/K to $16 \cdot 10^{-6}$ 1/K. In one embodiment, the glass of the glass composition used has an expansion coefficient lower than that of the feed-through component in order to provide compression sealing. The expansion coefficient of the glass material is optionally in the range of from $8 \cdot 10^{-6}$ 1/K to $20 \cdot 10^{-6}$ 1/K, optionally from $8 \cdot 10^{-6}$ 1/K to $16 \cdot 10^{-6}$ 1/K. Because of the higher expansion coefficient of the surrounding material in comparison with the glass or glass ceramic material, a compression is built up onto the glass or glass ceramic material by the metal, and a hermetically sealed feed-through is provided. The material of the conductor 7.1, 7.2 may be the same as the material of the base body or may include a different material such as copper, a copper alloy, CoSiC or in particular an NiFe alloy. The expansion coefficient of the metal pin lies in the range of from $8 \cdot 10^{-6}$ 1/K to $16 \cdot 10^{-6}$ 1/K, optionally between $8 \cdot 10^{-6}$ 1/K and $12 \cdot 10^{-6}$ 1/K. Owing to the expansion coefficient, NiFe or an NiFe alloy are optional as material for the conductors 7.1, 7.2. The expansion coefficient of NiFe, or of an NiFe alloy, is approximately $9 \cdot 10^{-6}$ 1/K, while the metallic material has an expansion coefficient of approximately $13 \cdot 10^{-6}$ 1/K, so that a sufficient prestress for a hermetically sealed feed-through can be built up. As mentioned above, instead of compression sealing, a matched feed-through in which the expansion coefficients of the conductor, base body or housing and glass or glass ceramic are approximately equal would also be conceivable.

According to the present invention, the electrical feed-through includes at least one guide component 10.1, 10.2, which according to the invention consists of a plastic material, for example a thermosetting plastic or a thermoplastic. The guide component 10.1, 10.2 is used to slide the plug 12, which is shown only for the guide component 10.2, onto the conductors 7.1, 7.2 of the feed-through. As material for the guide components 10.1, 10.2, a plastic, which may be obtained very simply by injection molding and therefore above all may be produced economically in comparison with a metal component, which entails a high manufacturing outlay with high costs, is provided instead of a metal.

It is optional for the guide component 10.1, 10.2 to be connected securely to the metal feed-through component 3. Secure connection means in the present case that the feed-through component and the guide component are connected non-releasably to one another. A particularly secure connection, in particular a firm connection, of the plastic part and the metal feed-through component 3 is achieved when the metal part has an undercut 20.1, 20.2. For example, a plastic material constituting the guide component 10.1, 10.2 is injected into the cavity with the undercut 20.1, 20.2. For this purpose, for example, the injection molding tool is introduced into the cavity with the undercut 20.1, 20.2. By the injection molding, a plastic guide component into which a plug can be introduced securely is produced. The plastic material is then retained in the undercut 20.1, 20.2 and, owing to the fact that the plastic part has a higher thermal expansion coefficient $\alpha$ than the metal, is seated firmly. The security, or the firm connection, is assisted in that the undercut is configured extending conically inward. The plug 12, which is slid onto the two conductors 7.1, 7.2 in the region of the guide 10.2, is held securely in a recess or opening 22 of the guide component with the aid of a projection or latch 14 of the plug. In the case of the plug inserted into the guide component, however, in contrast to the secure connection of the feed-through component and the guide component, securely is intended to mean a releasable connection rather than a firm connection. Thus, by depressing the projection or the latch 14, the plug may be released from the guide component 10.1, 10.2. As may also be seen from FIG. 1, the individual conductors 7.1, 7.2 are configured in such a way that they can be sealed centrally in the glass or glass ceramic material 9.1, 9.2. In such a case, the conductor protrudes on both sides out from the opening in the feed-through component and can be connected on both sides of the opening of the feed-through. The feed-through component 3 has a circumferential groove 30. The circumferential groove 30 is used so that the feed-through component can be inserted tightly together with the guide component into a separating wall, which includes an opening. For this purpose, an O-ring is placed in the groove 30. Optionally, the separating wall into which the feed-through component of the feed-through is inserted separates a wet or humid region, in particular from a dry region in which, for example, a control unit may be accommodated.

FIG. 2 shows a front view of the electrical feed-through according to the present invention. The feed-through component 3 with the total of six sealed conductors 7.1, 7.2, 7.3, 7.4, 7.5, 7.6 protruding from the feed-through component 3 may be seen clearly. In the embodiment represented, the plurality of sealed conductors are respectively sealed individually into an opening, that is to say the feed-through component 3 or the base body 3 has in total six openings, into each of which a conductor 7.1, 7.2, 7.3, 7.4, 7.5, 7.6 is sealed. Instead of many individual openings in the base body, into each of which a conductor is sealed, it would also be possible to provide a single opening in the base body, a plurality of conductors, for example all six conductors, being sealed together into this single opening. The feed-through component 3, which optionally consists of a metallic material, furthermore includes an opening 50 into which a screw can be inserted and tightened, in order to apply the feed-through component 3 securely on the separating wall.

FIG. 3 represents in detail the sealing of a conductor, which has contact elements on both sides of the feed-through component 3. The conductor 7.1, 7.2 is sealed in a glass material 9.1, 9.2 into the feed-through component 3 consisting of a metal. Only one wall, into the opening or openings of which the conductor is sealed, of the feed-through component 3 is represented.

Figure 4:
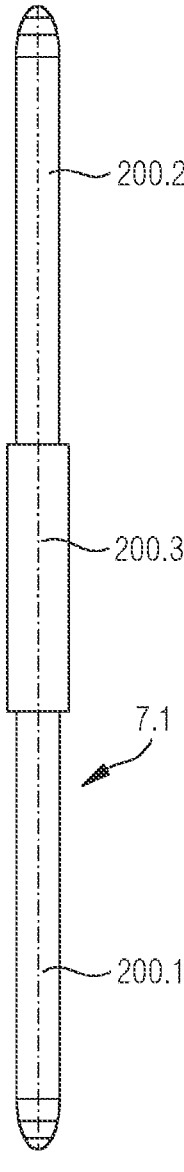
FIG. 4 shows a three-part conductor inserted into a feed-through according to the present invention.

According to a further aspect of the invention, a conductor which is obtained by connecting individual parts is provided. In the case of the conductor represented in FIG. 4, the conductor 7.1, 7.2 includes in total three individual parts. This is represented in detail in FIG. 4 for the conductor 7.1. The conductor 7.1 in the present case includes three sections 200.1, 200.2, 200.3. The sections 200.1, 200.2 optionally have a rectangular cross section, and the section 200.3 optionally has a round cross section for the purpose of sealing. For hermetically sealed sealing which provides a helium leakage rate of less than $10^{-8}$ mbar 1/s with a pressure difference of 1 bar, it is necessary for the central part to be configured rotationally symmetrically, that is to say round. The conductor of the electrical feed-through according to the present invention may in one embodiment of the invention be configured with three different sections, although it need not, and a conductor consisting of a single material or a one-piece conductor are also possible.

According to the present invention, the three-part conductor may be produced not as a one-piece component but from in total three individual parts, namely the two end parts 200.1, 200.2, onto each of which a plug is slid and which are not sealed and have a rectangular cross section, as well as the central part 200.3 having a round cross section for the sealing. The individual parts 200.1, 200.2, 200.3 are respectively produced in a separate method and are connected, for example by soldering and/or welding, to form the overall conductor 7.1. All the conductor parts are obtained from a wire. The advantage of the three-part conductor is that the individual parts may be prefabricated in a large quantity and the prefabricated individual parts may be assembled to form a conductor in a final method step.

Particularly in the case of a conductor which is composed of a plurality of individual parts, it is possible to select not only the cross section and the shape but also the material of each individual part differently. For instance, the materials of the end sections are optionally selected in such a way that they are tailored to the contact requirements of the plugs which are connected to the conductor. Optionally, the materials provide a low contact or junction resistance. A high conductivity is also advantageous. In order to provide a high conductivity, the end sections or end parts 200.1, 200.2 optionally consist of copper or a copper alloy. The material of the central section of the conductor is optionally tailored to the glass material and the nature of the sealing; that is to say there is a matched feed-through or a compression sealing. In one embodiment, the central part or the section 200.3 optionally consists of NiFe or an NiFe alloy. The selection of this material for the central part allows simple hermetically sealed sealing, for example in contrast to Cu, since the expansion coefficient of NiFe is only about $9 \cdot 10^{-6}$ 1/K, while the surrounding metal has an expansion of about $13 \cdot 10^{-6}$ 1/K. Further possible materials for the central section and/or end section of the conductor are brass, bronze, titanium, steel, stainless steel, aluminum or corresponding alloys. The conductor sections may include coatings which are tailored to the materials of the plugs which are connected to the conductor. For better introduction into the plug to be connected to the conductor, the end sections of the conductor may include introduction chamfers at the tip.

Figure 5:
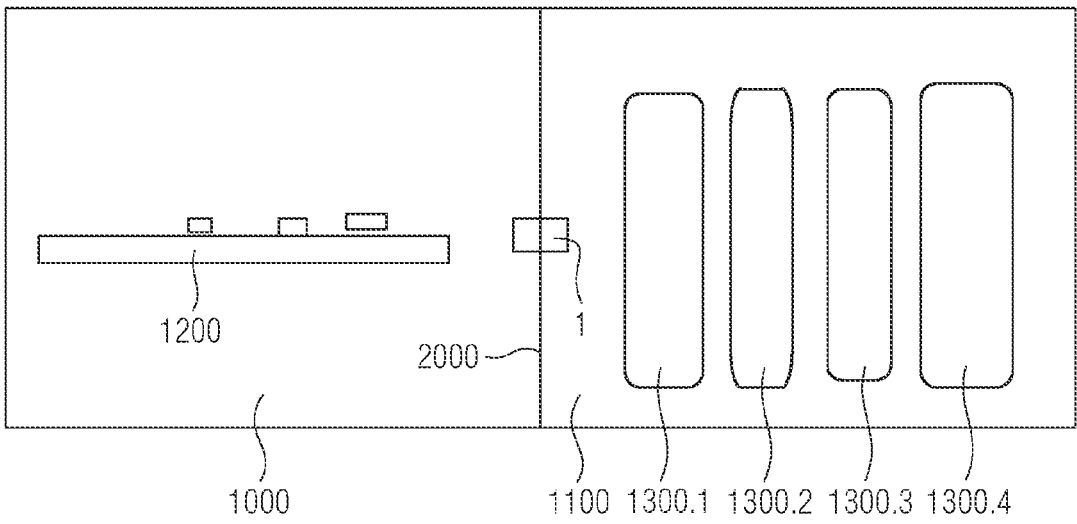
FIG. 5 shows an embodiment of the present invention having two regions, namely a dry region and a wet region.
Figure 6:
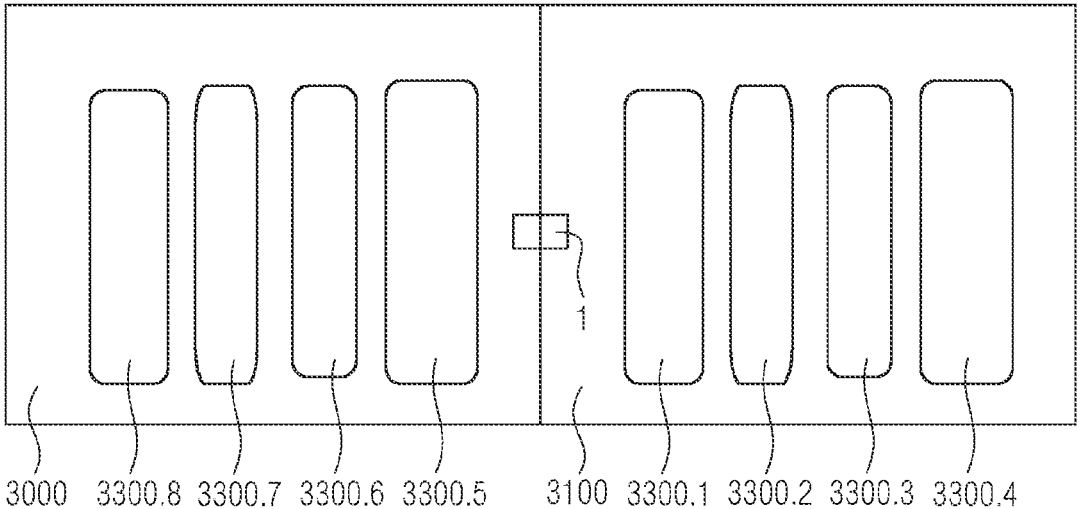
FIG. 6 shows an embodiment of the present invention having two regions, namely a first wet region and a second wet region.

FIGS. 5 and 6 show two examples, each having two regions, by way of example of the use of separating walls, optionally with the electrical feed-throughs according to the invention, for separating individual regions. There may of course also be more than two regions, for example three or four regions.

FIG. 5 shows a system, for example a storage system, having two regions, namely a dry first region 1000 and a humid second region 1100. In the present case, control electronics 1200 are arranged in the dry first region 1000. In the present case storage devices, for example, battery cells 1300.1, 1300.2, 1300.3, 1300.4, are arranged in the humid second region. For cooling, the storage devices 1300.1, 1300.2, 1300.3, 1300.4 may be provided with immersion cooling. For this purpose, the storage devices 1300.1, 1300.2, 1300.3, 1300.4 are immersed in an immersion liquid, for example a fluoropolymer, synthetic esters or hydrocarbon/oil mixtures. An electrical feed-through 1 according to the present invention is introduced into the separating wall 2000 between the first region 1000 and the second region 1100. The electrical feed-through 1 allows the first region 1000 and the second region 1100 to be electrically connected to one another, for example the control electronics 1200 accommodated in the first region 1000 to be electrically connected to the storage device 1300.1, 1300.2, 1300.3, 1300.3 accommodated in the second region 1100.

FIG. 6 shows a system which in turn has two regions, namely a first region 3000 and a second region 3100. In the configuration according to FIG. 6, both regions are humid regions. In the exemplary embodiment according to FIG. 6, a plurality of storage devices 3300.1, 3300.2, 3300.3, 3300.4, 3300.5, 3300.6, 3300.7, 3300.8, without restriction thereto, are arranged in the two humid regions. In the exemplary embodiment shown, the storage device is immersed in a cooling liquid, or an immersion liquid, both in the first region and in the second region. As previously in the configuration according to FIG. 5, the two regions 3000 and 3100 are electrically connected to one another by a feed-through 1 according to the present invention. Thus, for example, a series connection of a plurality of storage devices may be produced. Components which are the same as in FIG. 5 are denoted by the same references in FIG. 6.

As an alternative to arranging storage devices, in particular batteries, in the humid regions 3000, 3100, it would also be possible to provide one humid region, for example the region 3000, with an element of the control electronics instead of with a storage device. In such a case, the control electronics or parts of the control electronics would then also be cooled by immersion.

The feed-through according to the present invention is used particularly in a component, in particular a system, having a storage device and a separating wall which separates different regions, for example a humid region from a dry region. A control device, in particular for a storage device, may for example be arranged in the dry region of the system. The storage device itself, which may be cooled or thermally regulated by a liquid, for example water or oil or an immersion liquid, is arranged in the humid region.

With the feed-through component according to the present invention, it is for the first time possible in a straightforward way to provide a feed-through which provides reliable conduction through a separating wall which separates regions including different media. The feed-through according to the invention includes sealing which is pressure-resistant, coolant-resistant and/or electrolyte-resistant. The feed-through furthermore includes a fastening latch, which may be in one piece or assembled. Optionally, only control currents of a battery to be controlled are conveyed to a control unit and vice versa by the conductors. In contrast to the very heavy currents in the case of batteries, the control currents are currents with a low current value and virtually no development of heat. By the use according to the present invention of a feed-through component, it is possible for a plug, which may also easily be removed again from the conductors of the feed-through component, to be applied securely onto the conductor introduced into the feed-through component in a glass or a glass ceramic.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical feed-through, comprising:
a feed-through component having an opening;
at least one conductor sealed into the opening of the feed-through component in a glass material or a glass ceramic material, the at least one conductor including an end section; and
at least one guide component connected to the feed-through component, the at least one guide component including a material that is a plastic, the at least one guide component including a cavity in which the at least one conductor extends, the at least one guide component extending beyond the end section of the at least one conductor, the cavity being configured for at least partially receiving a plug inside the cavity when the plug is pushed onto the at least one conductor such that (i) a recess of the plug is connected to the end section of the at least one conductor and (ii) the plug is configured for making an electrical connection with the at least one conductor.

2. The electrical feed-through according to claim 1, wherein the at least one guide component is configured for being connected securely to the feed-through component.

3. The electrical feed-through according to claim 2, wherein the feed-through component comprises at least one undercut for secure connection to the at least one guide component.

4. The electrical feed-through according to claim 3, wherein the at least one undercut has a conical profile in a direction of the feed-through component.

5. The electrical feed-through according to claim 2, further comprising the plug received at least partially inside the cavity of the at least one guide component, wherein the plug is connected to the at least one conductor.

6. The electrical feed-through according to claim 5, wherein the is configured for being connected securely to the at least one guide component.

7. The electrical feed-through according to claim 6, wherein for secure connection of the at least one guide component and the plug, the at least one guide component comprises a recess and the plug comprises at least one latch or projection.

8. The electrical feed-through according to claim 1, wherein the at least one conductor comprises a first end section, a central section, and a second end section.

9. The electrical feed-through according to claim 8, wherein the first end section has a rectangular cross section, the central section has a round cross section, and the second end section has a rectangular cross section.

10. The electrical feed-through according to claim 8, wherein the first end section, the central section, and the second end section are individual parts which are connected to one another in order to form the at least one conductor.

11. The electrical feed-through according to claim 1, wherein the at least one conductor is configured in one piece with a rectangular cross section.

12. A storage system, comprising:
a first region;
a second region;
a separating wall which separates the first region from the second region; and
an electrical feed-through in the separating wall, the electrical feed-through comprising:
a feed-through component having an opening;
at least one conductor sealed into the opening of the feed-through component in a glass material or a glass ceramic material, the at least one conductor including an end section; and
at least one guide component connected to the feed-through component, the at least one guide component including a material that is a plastic, the at least one guide component including a cavity in which the at least one conductor extends, the at least one guide component extending beyond the end section of the at least one conductor, the cavity being configured for at least partially receiving a plug inside the cavity when the plug is pushed onto the at least one conductor such that (i) a recess of the plug is connected to the end section of the at least one conductor and (ii) the plug is configured for making an electrical connection with the at least one conductor.

13. The storage system according to claim 12, further comprising a storage device, wherein the second region comprises at least one controller configured for controlling the storage device.

14. The storage system according to claim 13, wherein the at least one controller is configured for emitting a plurality of control signals which are conducted via the electrical feed-through from the at least one controller to the storage device.

15. The storage system according to claim 12, wherein the first region is a humid region which has a liquid or an electrolyte, the second region being a dry region or a humid region, the electrical feed-through being configured for being used in the separating wall.

16. The storage system according to claim 12, wherein the liquid is at least one of water, oil, and an immersion liquid.

17. The storage system according to claim 12, wherein the separating wall comprises an opening into which the feed-through component is inserted.

18. A storage system, comprising:

a first region;

a second region; and a separating wall which separates the first region from the second region, the first region being at least one of a dry region and a humid region which comprises a liquid, the second region being a humid region having a storage cell, wherein the separating wall comprises an electrical feed-through comprising:

a feed-through component having an opening;

at least one conductor sealed into the opening of the feed-through component in a glass material or a glass ceramic material, the at least one conductor including an end section; and at least one guide component connected to the feed-through component, the at least one guide component including a material that is a plastic, the at least one guide component including a cavity in which the at least one conductor extends, the at least one guide component extending beyond the end section of the at least one conductor, the cavity being configured for at least partially receiving a plug inside the cavity when the plug is pushed onto the at least one conductor such that (i) a recess of the plug is connected to the end section of the at least one conductor and (ii) the plug is configured for making an electrical connection with the at least one conductor.

19. The storage system according to claim 18, wherein the liquid is at least one of water, oil, and an immersion liquid for cooling.

20. The electrical feed-through according to claim 1, wherein the end section is a first end section, wherein the at least one conductor includes a second end section opposing the first end section, wherein the at least one guide component is a first guide component, wherein the electrical feed-through further includes a second guide component, which is connected to the feed-through component, includes a material that is a plastic, includes a cavity in which the at least one conductor extends, and extends beyond the second end section of the at least one conductor, wherein the first guide component and the second guide component are positioned respectively on either side of the feed-through component, the feed-through component being made of a metal.

\* \* \* \* \*